(12) United States Patent
Dalal et al.

(10) Patent No.: US 7,272,408 B2
(45) Date of Patent: Sep. 18, 2007

(54) MILLIMETRE WAVE(MMW) COMMUNICATION SYSTEM AND METHOD USING MULTIPLE RECEIVE AND TRANSMIT ANTENNAS

(75) Inventors: Hezi Dalal, Kfar Saba (IL); Yossi Steinberg, Kfar Saba (IL)

(73) Assignee: Millimetrix Broadband Networks Ltd., Kibbutz Eyal (IL)

( * ) Notice: Subject to any disclaimer, the term of this patent is extended or adjusted under 35 U.S.C. 154(b) by 812 days.

(21) Appl. No.: 10/344,861

(22) PCT Filed: Aug. 9, 2001

(86) PCT No.: PCT/US01/24913

§ 371 (c)(1),
(2), (4) Date: Feb. 19, 2003

(87) PCT Pub. No.: WO02/15456

PCT Pub. Date: Feb. 21, 2002

(65) Prior Publication Data

US 2004/0067775 A1    Apr. 8, 2004

(51) Int. Cl.
*H04B 7/00* (2006.01)
*H04B 7/15* (2006.01)
*H04M 1/00* (2006.01)

(52) U.S. Cl. ............... 455/502; 455/11.1; 455/41.2; 455/550.1; 728/78; 728/82; 343/795

(58) Field of Classification Search ........... 405/3.01, 405/3.05, 803, 41.2, 502, 500, 507, 11.1, 405/67.15, 550.1, 553.1, 554.2, 561, 575.7, 405/130

See application file for complete search history.

(56) References Cited

U.S. PATENT DOCUMENTS

| | | | | |
|---|---|---|---|---|
| 5,917,371 | A * | 6/1999 | Chesarek et al. | 330/124 R |
| 6,023,458 | A * | 2/2000 | Tweedy et al. | 370/328 |
| 6,147,648 | A * | 11/2000 | Granholm et al. | 343/700 MS |
| 6,351,246 | B1 * | 2/2002 | McCorkle | 343/795 |
| 6,965,784 | B2 * | 11/2005 | Kanamaluru et al. | 455/562.1 |
| 7,020,890 | B1 * | 3/2006 | Suematsu et al. | 725/78 |

* cited by examiner

Primary Examiner—Tony T. Nguyen
(74) Attorney, Agent, or Firm—Mark M. Friedman

(57) ABSTRACT

The spectral efficiency of a millimeter wave (MMW) communication system (100) is enhanced by using multiple receive (116a, 116b ... 116r) and transmit antenna elements (114a, 114b ... 114t), arranged in arrays. Each of the receive antenna elements (116a, 116b ... 116r) receives the signals transmitted from all of the transmit antenna elements (114a, 114b ... 114t) with different degrees of phase shift. The signals which are received are combined in a one channel and substantially cancels out all others, thereby achieving channel separation. The spectral efficiency increases linearly with the number of antenna elements (per array). The spectral efficiency of an array can further be increased by using dual polarization antenna elements and techniques.

25 Claims, 7 Drawing Sheets

MILLIMETRE WAVE(MMW) COMMUNICATION SYSTEM AND METHOD USING MULTIPLE RECEIVE AND TRANSMIT ANTENNAS

TECHNICAL FIELD OF TUE INVENTION

The invention relates to point-to-point, line-of-sight communications, and more specifically to millimeter-wave (MMW) communications.

BACKGROUND OF THE INVENTION

Multiple antenna systems have successfully been used in lower-frequency microwave radio systems to improve spectral efficiency and to overcome certain types of noise. Examples of such lower-frequency microwave radio systems include cellular telephone communications, MMDS (Multi-channel Multipoint Distribution Service), and point-to-multipoint systems. Unfortunately, the multiple antenna techniques employed by such systems are relatively ineffective for MMW communications for a variety of reasons.

Multiple antenna arrangements are frequently referred to as multi-antenna arrays. A typical array is defined in terms of the n umber, arrangement and spacing of the antennas in the array.

In lower-frequency microwave radio systems, the channel between any transmitting antenna and receiving antenna is characterized by multipath and fading effects. The degree and type of fading seen at an antenna element depends heavily upon its location. As a result, different antenna elements at an array of receive antennas see different fading effects from each antenna in an array of transmit antennas.

The transfer characteristics of the various transmit antenna to receive antenna paths (channels) in multi-antenna systems are generally organized and analyzed in the form of a matrix, referred to as a "channel transfer matrix". The channel transfer matrix for lower-frequency microwave systems generally takes the form of a "random" matrix defined by random fading effects of the various channels. Prior-art multi-antenna systems rely on these fading effects and utilize a specially devised encoding scheme (referred to as space-time coding) to improve the spectral efficiency of the system. In such systems, the spectral efficiency increases linearly with the number of antennas.

A typical MMW channel has transfer characteristics that are quite different from those of lower-frequency microwave channels. The relatively short wavelength of MMW transmissions results in very high antenna directionality and susceptibility to heavy signal attenuation by rain. Because of this, MMW communication systems are generally limited to short, line-of-sight links. In such an environment, it can be assumed that the primary mechanism of fading in MMW systems is rain attenuation, and that antenna elements spaced apart by a few meters experience essentially the same fading effects, thereby preventing the use of differential fading effects for channel discrimination. Further, because of their high frequency (and the resultant short wavelength) MMW communications systems are highly susceptible to phase noise.

In QAM (Quadrature Amplitude Modulated) MMW communication systems, there are practical limits on the useful size and spacing multi-antenna arrays due to radio limitations and impairments. Because of their heavy reliance on differential fading effects to achieve channel discrimination, prior-art multi-antenna techniques employed in lower-frequency microwave communication systems are not well-suited to short-link MMW communications where differential fading effects are negligibly small in antenna arrays of practical size.

The practical limits on the size and spacing of antenna arrays for QAM MMW communications effectively nullify the usefulness of differential fading for channel discrimination. Thus, prior-art multi-antenna techniques are of little or no use in attempting to improve the spectral efficiency of MMW communications.

Evidently there is a need for other techniques for improving the spectral efficiency of point-to-point, line-of-sight MMW communications. Any such techniques must be capable of operating in an environment where differential fading is not present, and where a high level of phase noise characterizes the channel. Further, in order to be useful, any such techniques should provide significant improvements over the spectral efficiency realized with a single transmit antenna and a single receive antenna.

Terms and Notational Conventions

In the discussion of the present invention, the following terms and notational conventions are used:

| | |
|---|---|
| $f_c$ | refers to carrier frequency |
| $\lambda$ | refers to carrier wavelength |
| Q | refers to a transmit shaping process |
| W | refers to a receive equalization process |
| L | refers to overall link length—the linear distance between a transmit antenna array and a receive antenna array |
| $L_{k,l}$ | (i.e., subscripted versions of "L") are matrix elements that refer to the individual link lengths between individual transmit antenna elements and receive antenna elements, with the subscripts k, l indicating that the path is between a "$k^{th}$" receive antenna element and a "$l^{th}$" transmit antenna element. |
| $T_{k,l}$ | (i.e., subscripted versions of "T") are matrix elements that refer to the complex transfer characteristics or "gain" of specific "communication paths" or "channels" between specific elements of the receive and transmit antenna arrays, with the subscripts k, l indicating that the path is between a "$k^{th}$" receive antenna element and a "$l^{th}$" transmit antenna element. |
| T | channel transfer matrix. The overall composite complex gain (in matrix form) of a composite communication channel or transmission path between transmit and receive antenna arrays. The matrix elements $T_{k,l}$ are functions of the geometry of the receive and transmit arrays, which is in turn determined as a function of the carrier wavelength $\lambda$ and the link length L. |
| r | refers to the number of receive antennas in a receive antenna array. |
| t | refers to the number of transmit antennas in a transmit antenna array |
| s | refers to the number of independent symbol streams (data streams) |
| d | refers to a distance between antennas within an array (antenna spacing) |
| i, j | imaginary unit. Due to overlapping conventions, i and j are used interchangeably. Both are equal to $(-1)^{1/2}$, the elementary imaginary unit in complex notation. |
| I | an identity matrix. (An identity matrix is a diagonal matrix with 1's along the primary diagonal and 0's elsewhere) |
| *a | complex conjugate. If a = x + iy, then *a = x − iy |
| $A^{-1}$ | The "inverse" of matrix A. The product of a matrix and its inverse is I. |
| $A^T$ | The "transpose" of a matrix, or a row-for-column swap. If $B = A^T$, where A and B have elements $a_{ij}$ and $b_{ij}$, respectively, in row i and column j, then $b_{ij} = a_{ji}$. |
| $A^H$ | The "conjugate" transpose of a matrix. Similar to the transpose, except that instead of a simple row-for-column swap, each element is replaced with its complex conjugate. That is, if $B = A^H$ where A and B have elements $a_{ij}$ and $b_{ij}$, respectively, in row i and column j; then $b_{ij} = *a_{ji}$. For real valued matrices, $A^H = A^T$ |

-continued

| | |
|---|---|
| unitary matrix | A matrix is unitary if it is square (has an equal number of rows and columns) and its inverse is equal to the complex conjugate of its transpose. That is, a matrix A is unitary if $A^H = A^{-1}$, such that $AA^H = I$. In a frequently used broader sense (also used within this specification), a matrix is considered to be unitary if $AA^H = kI$, where k is a real-valued scalar constant, that is, a matrix need not be normalized to be considered unitary. |

BRIEF DESCRIPTION (SUMMARY) OF THE INVENTION

The present inventive technique employs multi-antenna transmit and receive arrays, with and without dual polarization, to improve spectral efficiency of MMW communications between two locations. Unlike prior-art techniques used at lower microwave frequencies that rely on differential channel fading effects and space-time coding to effect channel separation, the present inventive technique exploits array geometry in combination with suitable transmit shaping and receive equalization to increase the number of effective channels between two locations. The geometry of the antenna arrays, the transmit shaping and the receive equalization are determined according to the carrier frequency and the link length (distance between the antenna arrays) to optimize "performance", (e.g., as measured in terms of residual mean-squared error at equalizer outputs). As described hereinbelow, the present inventive technique takes advantage of the short wavelength of MMW signals and short link lengths (transmission distances) associated therewith to utilize multi-antenna arrays that fall within practical limits of MMW communications.

According to the invention, a millimeter-wave (MMW) communication system comprises a transmit subsystem for providing signals to a plurality of transmit antenna elements, and a receive subsystem for receiving the signals from a plurality of receive antenna elements, wherein the transmit and receive antenna elements are physically arranged so that each of the receive antenna elements receives the signals transmitted from all of the transmit antenna elements with differing degrees of phase shift. At the receiver, the signals are combined in a manner which emphasizes one channel and substantially cancels out all others, thereby achieving channel separation.

The transmit and receive antenna elements are suitably arranged in arrays. Typically, in point-to-point communication systems, the transmit and receive antenna arrays have the same number of antenna elements and geometries mirroring each other, but the invention is not limited to such.

An aspect of the present invention is to select array geometries and inter-element spacing d between antenna elements in an array that produce a channel transfer matrix T which is a unitary matrix. In this manner, the spectral efficiency of the MMW communication is enhanced, typically increasing linearly with the number of antenna elements. The spectral efficiency can further be increased by using dual polarization techniques.

Other objects, features and advantages of the invention will become apparent in light of the following description thereof.

BRIEF DESCRIPTION OF THE DRAWINGS

Reference will be made in detail to preferred embodiments of the invention, examples of which are illustrated in the accompanying drawings. The drawings are intended to be illustrative, not limiting. Although the invention will be described in the context of these preferred embodiments, it should be understood that it is not intended to limit the spirit and scope of the invention to these particular embodiments.

Often, similar elements throughout the drawings may be referred to by similar references numerals. For example, the element 199 in a figure (or embodiment) may be similar in many respects to the element 299 in an other figure (or embodiment). Such a relationship, if any, between similar elements in different figures or embodiments will become apparent throughout the specification, including, if applicable, in the claims and abstract. In some cases, similar elements may be referred to with similar numbers in a single drawing. For example, a plurality of elements 199 may be referred to as 199*a*, 199*b*, 199*c*, etc.

In the interest of simplifying mathematical notation, a convention may be used where elements of an array of like elements identified with letters in a Figure (e.g., 299*a*, 299*b*, etc.) are associated with ordinal numbers (1, 2, etc., or first, second, etc.) in order of their letter assignment. That is, 299*a* would be referred to as element number 1 or the first element, element 299*b* would be referred to as element number 2 or the second element, and so on. This convention is used primarily, but not exclusively, for subscripted variables and constants. For example, if the heights of an array of elements 299*a*, 299*b*, and 299*c* were to be represented as subscripted elements of a height array h, then the height of the first element 299*a* is given by $h_1$, the height of the second element 299*b* is given by $h_2$, and the height of the third element 299*c* is given by $h_3$.

Certain elements in selected ones of the drawings may be illustrated not-to-scale, for illustrative clarity.

Figure 1:
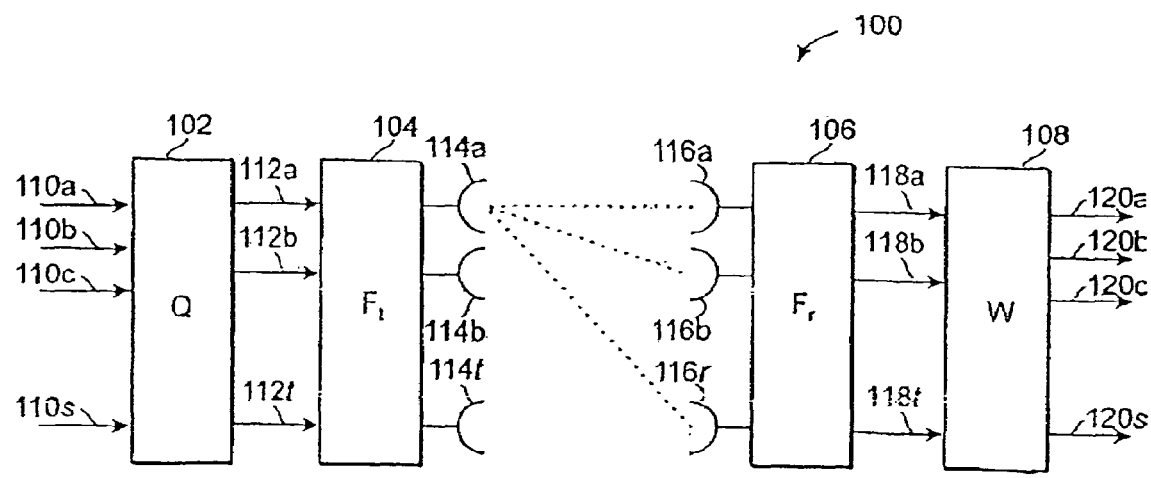
Figure 2:
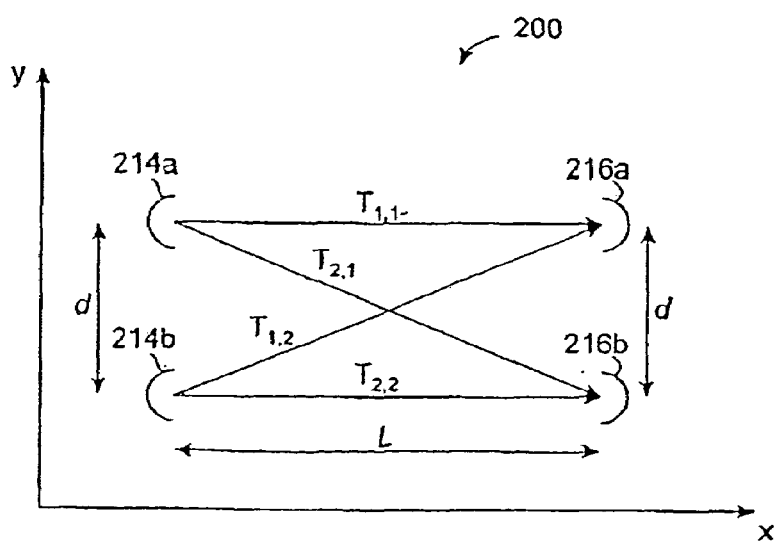
Figure 3:
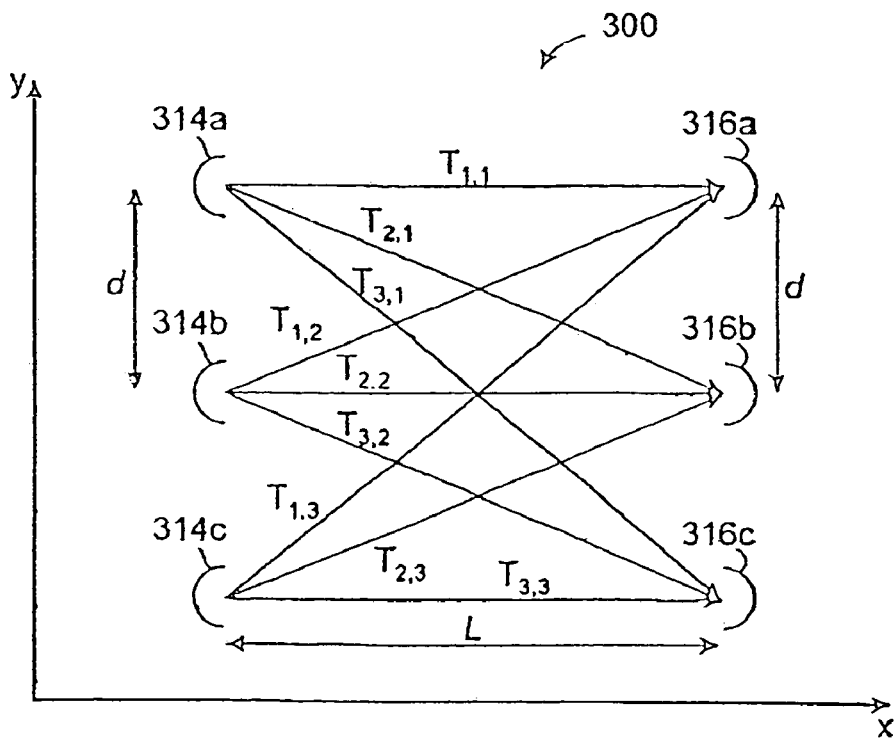
Figure 4:
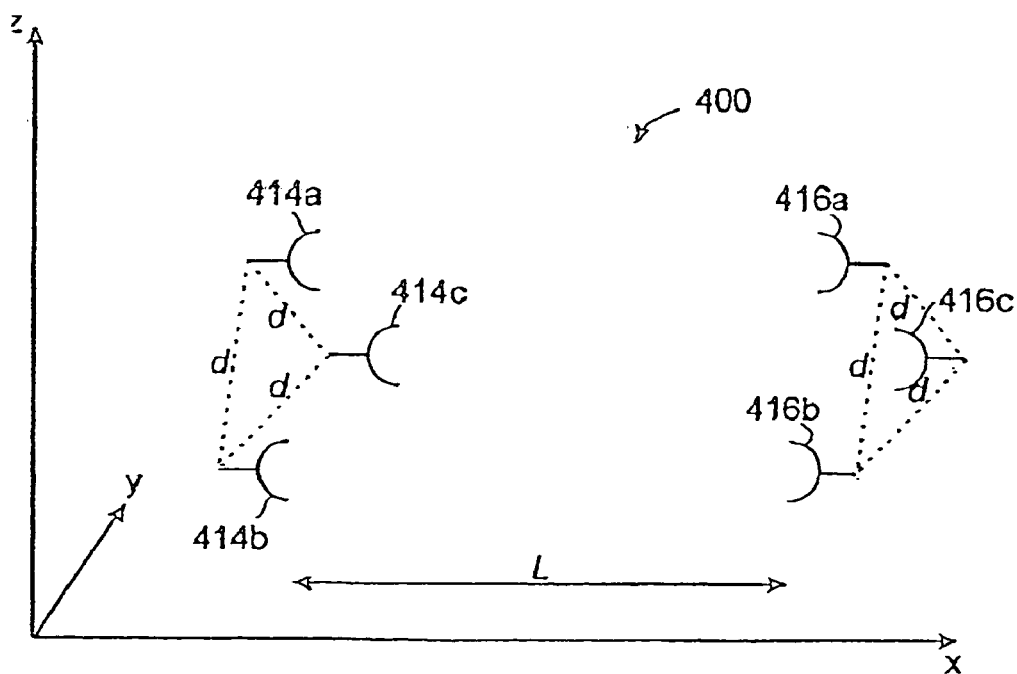
Figure 5:
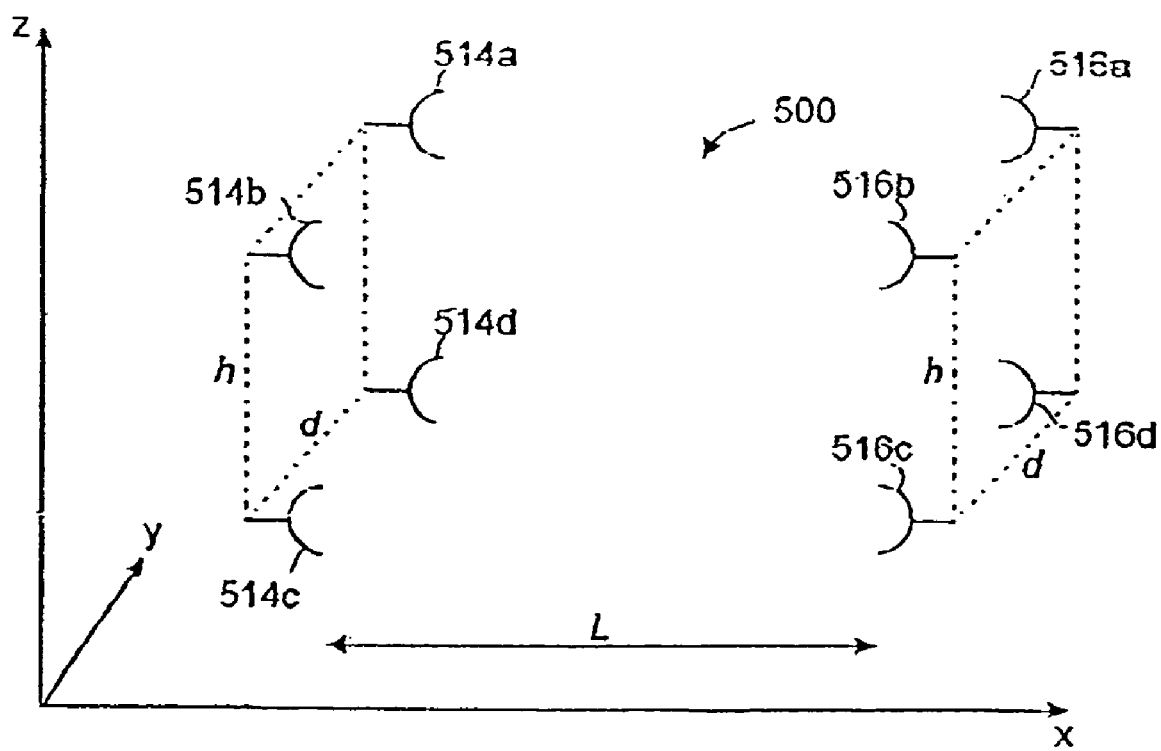
Figure 6:
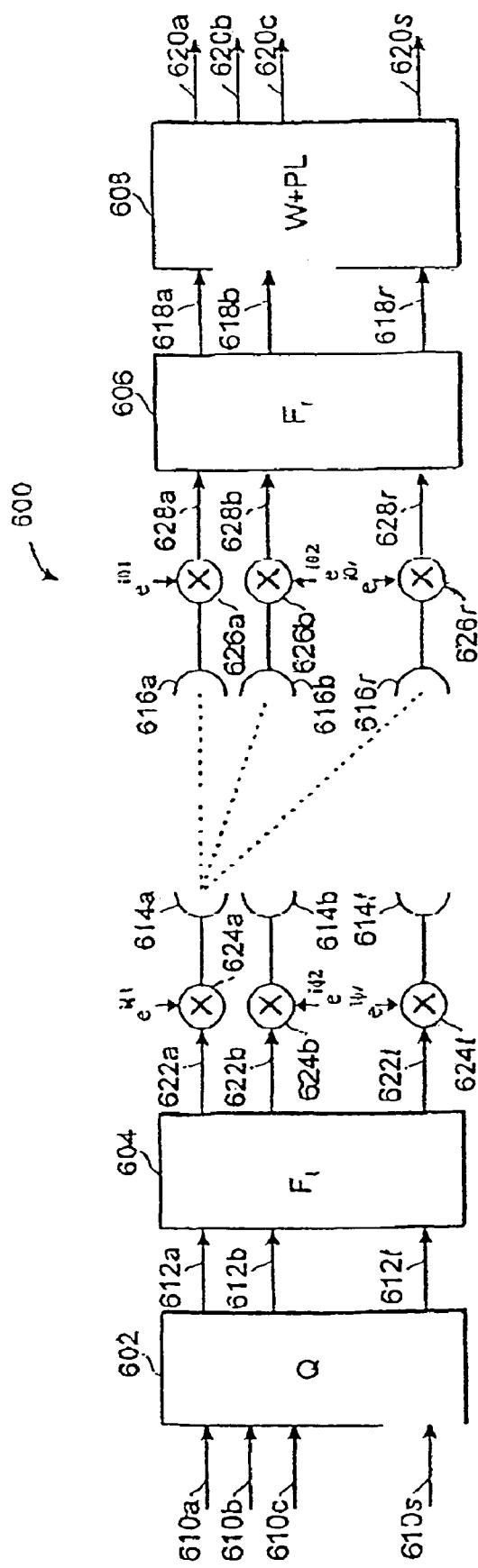
Figure 7:
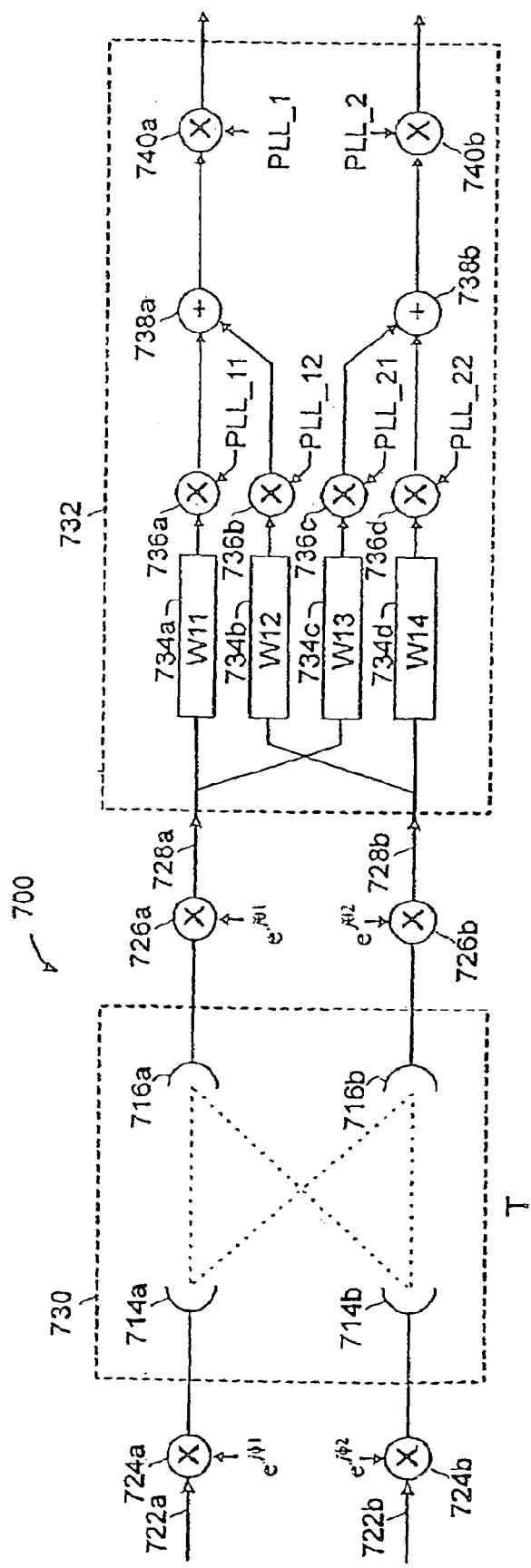
Figure 8:
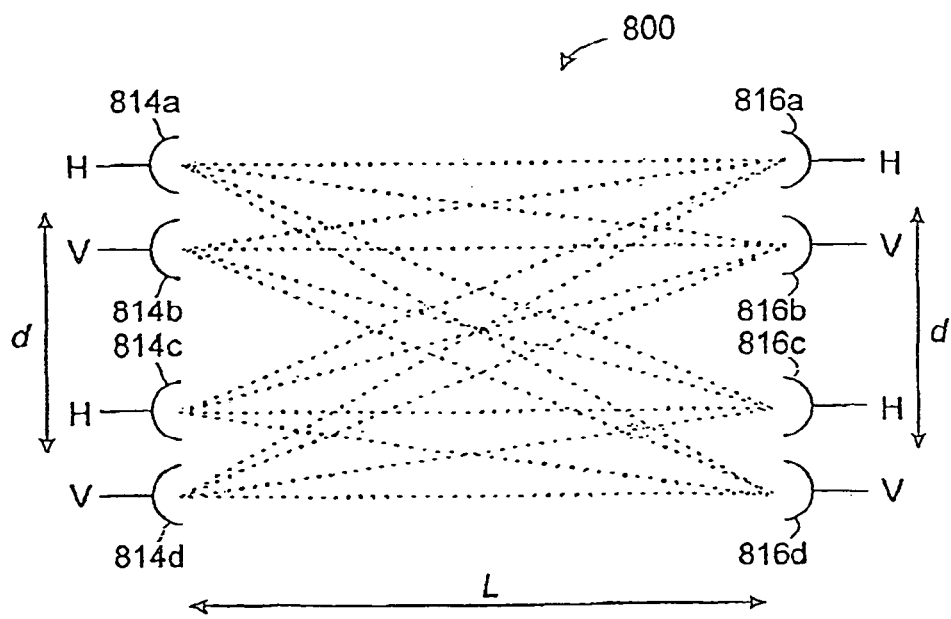
Figure 9:
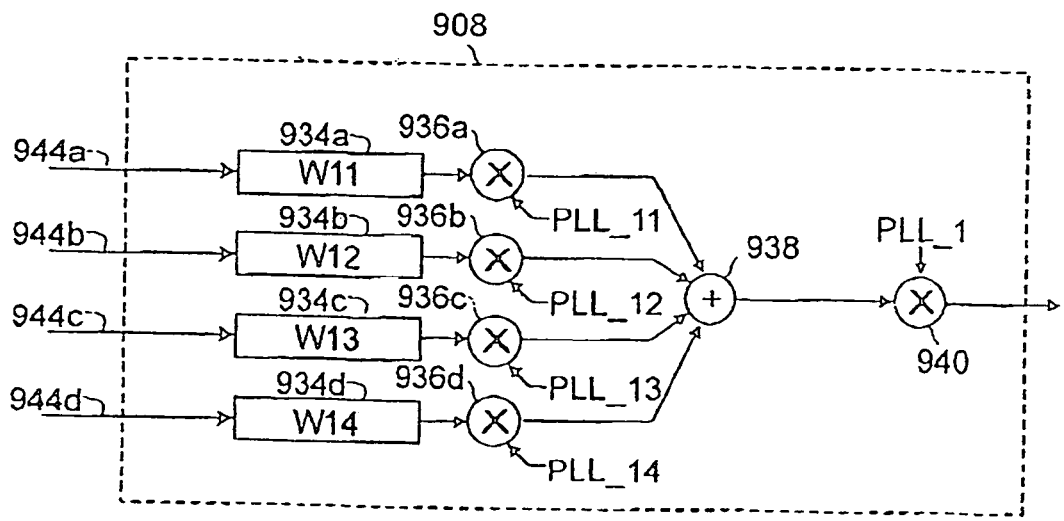
Figure 10:
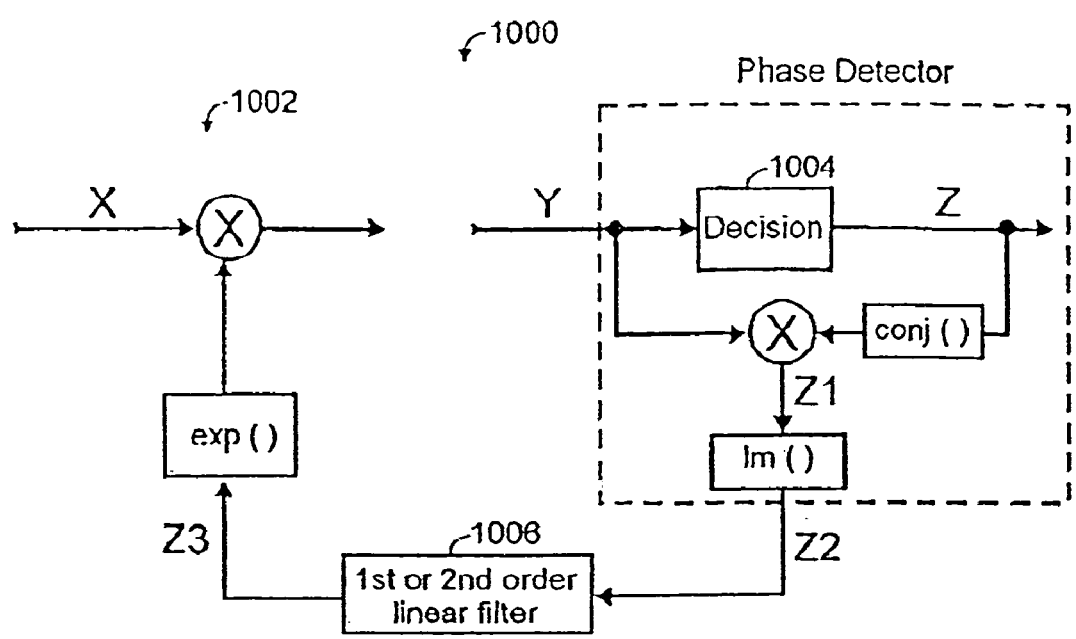

The structure, operation, and advantages of the present preferred embodiment of the invention will become further apparent upon consideration of the following description taken in conjunction with the accompanying drawings, wherein:

FIG. 1 is a block diagram of a system for MMW communication, according to the invention;

FIG. 2 is a diagram of an antenna arrangement for MMW communication having two transmit antennas and two receive antennas, according to the invention;

FIG. 3 is a diagram of an antenna arrangement for MMW communication having three linearly arranged transmit antennas and three linearly arranged receive antennas, according to the invention;

FIG. 4 is a diagram of an antenna arrangement for MMW communication having three triangularly arranged co-planar transmit antennas and three triangularly arranged co-planar receive antennas, according to the invention;

FIG. 5 is a diagram of an antenna arrangement for MMW communication having four rectangularly arranged co-planar transmit antennas and four rectangularly arranged co-planar receive antennas, according to the invention;

FIG. 6 is a block diagram of a system for MMW communication, according to the invention, showing phase noise sources;

FIG. 7 is a block diagram of portions of a multi-antenna MMW communication system associated with phase noise, equalization, and phase noise cancellation, according to the invention;

FIG. 8 is a diagram of an arrangement of bi-polar transmit and receive antenna for MMW communication, according to the invention;

FIG. 9 is a block diagram of a portion of a receive equalizer and phase noise cancellation for MMW communication, according to the invention; and FIG. 10 is a block diagram of a typical PLL which can be used with the present invention to cancel phase noise.

DETAILED DESCRIPTION OF THE INVENTION

The present inventive technique employs multi-antenna receive and transmit arrays to provide a MMW communication system wherein spectral efficiency and capacity increase with the number of antennas. The technique takes advantage of the array geometry and short wavelength of MMW communication to achieve channel selectivity. Unlike prior-art multi-antenna techniques, the present inventive technique does not rely on space-time coding and statistical fading effects for channel separation (selectivity).

The system includes a transmit subsystem driving an array of transmit antennas and a receive subsystem that receives signals from an array of receive antennas. Because of the characteristics of MMW signals, MMW communication is generally limited to point-to-point, line-of-sight operation. As a result, each of the transmit and receive antenna arrays need not be widely distributed (as in lower-frequency microwave systems), thereby resulting in practical size and span of receive and transmit antenna arrays. Because the antennas in any MMW multi-antenna array are physically arranged to be relatively close to one another, each of the receive antennas receives all of the transmitted signals from all of the transmit antennas simultaneously and with approximately the same intensity, but with differing degrees of phase shift. Due to the very short wavelength of MMW communication, the phase difference between signals from different transmit antennas as seen at any receive antenna is significant, even for closely spaced antennas. Preferably, the transmit array and the receive array each have the same number of antenna elements and have matching (mirrored) geometry. For simplicity of presentation, the examples presented in this invention have matching geometry, but the invention is not limited to such.

Those of ordinary skill in the art will understand that in the following discussion the term "antenna element" is not necessarily restricted to references to physically separate antennas and that the terms antenna and antenna element can be used interchangeably. In a multi-beam antenna, an "antenna element" element is one beam-emitting portion thereof. One example of this is a bipolar antenna that comprises one physical unit, but emits two substantially independent beams. The portions of bipolar antenna that emit separate beams are referred to as antenna elements, or alternatively, simply as antennas. Accordingly, then the number of "antennas" or "antenna elements" in an array is equivalent to the number of separate beams that can be generated by the array and may only peripherally be related to the number of physically separate antenna units in the array.

In the following discussion of the present invention, transmit antenna arrays and receive antenna arrays have "corresponding antenna elements" and "non-corresponding antenna elements". Corresponding antenna elements in transmit and receive antenna arrays are positioned directly across from, aligned with, and aimed directly at one another. (This is the ideal positioning. The system performance is very robust and insensitive to inaccuracies in the positioning of the antennas.) In the Figures, corresponding antenna elements are labeled similarly, e.g., 314a and 316a, 314b and 316b, etc. As a result, and in accordance with the aforementioned ordinal numbering convention, corresponding antenna elements are purposefully referred to with the same ordinal numbers. That is, 314a and 316a are the first transmit antenna element and the first receive antenna element, respectively, and are corresponding antenna elements. Similarly, 314b and 316b are the second transmit antenna element and the second receive antenna element, respectively, and are corresponding antenna elements. The individual link length $L_{k,k}$ between corresponding antenna elements are exactly equal to the overall link length L, and are referred to as "direct link lengths". Note that when referring to direct link lengths the notation $L_{k,k}$ has the same ordinal subscript for both receive and transmit elements.

Distances between non-corresponding antenna elements $L_{k,l}$ (where the subscripts "k" and "l" are different) are referred to a "cross-link lengths", and are always longer than the direct link lengths by an amount dependent upon the link length L and the physical geometry of the array.

FIG. 1 is a block diagram of a generalized form of a system 100 for MMW communication, according to the invention. The system 100 comprises a transmit shaping section 102, a transmitter section 104, an array of t transmit antenna elements 114a, 114b . . . 114t, an array of r receive antenna elements 116a, 116b . . . 116r, a receiver section 106, and an equalizer section 108. A plurality of s transmit data streams 110a, 110b, 110c . . . 110s, each stream comprising symbols to be transmitted, is shaped by the transmit shaping section 102 to produce t transmit streams 112a, 112b . . . 112t. The transmit section 104 transmits each of these streams over a corresponding one of the transmit antenna elements 114a, 114b . . . 114t. Each of an array of r receive antenna elements 116a, 116b . . . 116r receives signals from all of the transmit antennas 114a, 114b . . . 114t simultaneously, but with phase shifts incurred in relation to their positions in the respective receive and transmit arrays. The receiver section 106 receives and boosts the signal from the r receive antenna elements 116a, 116b . . . 116r, producing receive streams 118a, 118b . . . 118r. The equalizer section 108 equalizes and compensates the receive streams 118a, 118b . . . 118r, isolating and separating components of the transmitted signals therein by knowledge of their relative phase difference to produce received data streams 120a, 120b, 120c . . . 120s corresponding to transmit data streams 110a, 110b, 110c . . . 110s. Preferably, the number r of receive antennas equals the number t of transmit antennas.

In point-to-point, line of sight MMW communication, each of the receive antenna elements 116a, 116b . . . 116r experiences the same instantaneous channel attenuation characteristics (flat fading), thus rendering prior-art multi-antenna methods generally useless. However, due to slightly different link distances $L_{k,l}$ between individual elements of the transmit and receive antenna arrays, each receive antenna element 116a, 116b . . . 116r receives transmissions from each of the different transmit antenna elements 114a, 114b . . . 114t with different carrier phase. Because of the short wavelengths involved in MMW communications (typically on the order of 10-15 mm), even small differences in path length result in significant phase differences.

According to the present invention, s independent streams of symbols 110a, 110b, 100c . . . 110s are convolved with a transmission pulse and then multiplexed into the t transmit streams 112a, 112b . . . 112t via a transmit shaping matrix Q in the transmit shaping section 102. Symbols (encoded units of data) forming the s streams 110a, 110b, 100c . . . 110s can originate from uncoded sources, or can be symbols emitted from one or more coding systems. The resulting composite signal seen at the receive antenna array is represented in complex baseband by the matrix equation:

$$y = F_r T F_t Q\ a + n$$

where y is an r×1 complex vector representing the composite received signal as represented on the r receive streams 118a, 118b ... 118r. Information vector a is an s×1 vector of information symbols (coded or uncoded) representing data encoded onto the s transmit data streams 110a, 110b, 100c ... 110s. T is a r×t (r times t) matrix representing the composite complex transfer characteristics of the transmission path between the transmit and receive antenna arrays. Elements $T_{k,l}$ of the matrix T represent the transfer characteristics of individual transmission paths between individual transmit antenna elements and individual receive antenna elements. Q is a t×s transmit shaping matrix representing the manner in which symbol data on the s transmit data streams 110a, 110b, 100c ... 110s modulates the transmit pulse and is distributed across the t transmit streams 112a, 112b ... 112t. The noise vector n is an r×1 complex Gaussian noise vector representing noise experienced at each of the r receive antenna elements.

$F_t$ and $F_r$ are diagonal matrices representing the gains of the individual transmit and receive antenna elements, respectively, accounting for the transmit antenna response to the digital transmit pulse, receive antenna response to the transmitted pulse and IF filter response characteristics, assuming flat channel response (channel characteristics are lumped into T). The signal y is passed through the equalizer section 108 (via the r receive streams 118a, 118b ... 118r), wherein an equalization matrix W separates signals from the transmit antennas from one another and reconstructs the receive data streams 120a, 120b, 120c ... 120s.

Since it can be assumed that channel fading (attenuation) is essentially the same for all transmission paths between individual transmit antenna elements and individual receive antenna elements (flat fading), channel fading can be represented as a single scalar number representing the instantaneous channel fading seen by all transmission paths (channels) simultaneously.

According to the invention, the transmit shaping matrix Q and the transmit and receive array spacing and geometry are determined as a function of carrier wavelength λ (or frequency) and link length L. These parameters are determined so that a resultant equivalent transfer matrix $F_r T F_t Q$ can readily be inverted without introducing significant sources of error. In essence, this means selecting the transmit shaping matrix Q and the antenna array spacing and geometry to take maximum advantage of the phase differences over transmission paths of differing lengths to achieve channel discrimination with minimal SNR (signal-to-noise ratio) degradation. In its most elementary form, this technique is described hereinbelow with respect to a basic antenna arranged shown in FIG. 2.

Applicability to a Variety of Antenna Array Configurations

FIG. 2 is a diagram of an antenna arrangement 200 for MMW communication having a transmit array comprising two transmit antenna elements 214a, 214b and a receive array comprising two receive antennas 216a, 216b. Individual channel transfer characteristics $T_{1,1}$, $T_{1,2}$, $T_{2,1}$ and $T_{2,2}$ are shown between the individual transmit and receive antenna elements. In accordance with the aforementioned ordinal notation convention, $T_{1,1}$ refers to the transfer characteristics for the path from the first transmit antenna element 214a to the first receive antenna element 216a, $T_{2,1}$ refers to the transfer characteristics for the path from the first transmit antenna element 214a to the second receive antenna element 216b, $T_{1,2}$ refers to the transfer characteristics for the path from the second transmit antenna element 214b to the first receive antenna element 216a, and $T_{2,2}$ refers to the transfer characteristics for the path from the second transmit antenna element 214b to the second receive antenna element 216b.

An overall link length L represents the linear distance between the two antenna arrays. An antenna element span d represents the distance between the first and second transmit antenna elements 214a and 214b. The distance between the first and second receive antenna elements 216a and 216b is the same distance d, for the example of FIG. 2. Since there are only two transmit antenna elements 214a and 214b, and two receive antenna elements 216a and 216b, the distance d refers to both array span and array spacing.

The present inventive technique is demonstrated by example hereinbelow using the antenna arrangement of FIG. 2, with respect to the block diagram structure of FIG. 1. It is assumed that the two transmit antenna elements 214 and 214b are positioned directly across from, aligned with, and aimed directly at the two receive antenna elements 216a and 216b such that the direct link length $L_{1,1}$ between the first transmit antenna element 214a and the first receive antenna element 216a is equal to the direct link length $L_{2,2}$ between the second transmit antenna element 214b and the second receive antenna element 216b, and both are substantially exactly equal to the link distance L. That is:

$$L_{1,1} = L_{2,2} = L$$

For the antenna arrangement of FIG. 2, the cross-link lengths are given by:

$$L_{1,2} = L_{2,1} = \sqrt{L^2 + d^2}$$

For reasons that will become apparent in the discussion below, the antenna spacing d is chosen so that the cross-link lengths are longer than the direct link lengths by an amount equal to one quarter of the carrier wavelength, or λ/4. This condition is met by determining d as follows:

$$L_{1,2} = L_{1,1} + \frac{\lambda}{4}$$

$$\sqrt{L^2 + d^2} = L + \frac{\lambda}{4}$$

$$d = \sqrt{L\frac{\lambda}{2} + \frac{\lambda^2}{16}}$$

A difference in length of a quarter wavelength is equivalent to a multiplication by the imaginary constant $j = (-1)^{1/2}$ in complex baseband representation. Therefore, assuming flat fading (substantially identical fading seen on all transmission paths between transmit and receive antenna elements), the composite communication channel between the transmit antenna array and the receive antenna array can be represented by a complex baseband channel transfer matrix as:

$$T = C_f \begin{pmatrix} 1 & j \\ j & 1 \end{pmatrix}$$

where $C_f$ is a scalar constant corresponding to the instantaneous fading, common to all paths in line of sight point-to-point communication. Assuming two transmit data streams (s=2), it is simplest to direct the symbol streams independently to the two transmit antenna elements. This is accomplished by setting the transmit shaping matrix equal to an identity matrix, that is: Q=I.

Because of the choice of antenna element spacing d, the channel transfer matrix T is a unitary matrix. That is:

$$TT^H = C_f^2 I$$

where the notation $T^H$ refers to the conjugate transpose of matrix T. This means that complete channel separation (isolation of the independently transmitted streams) can be accomplished without noise amplification. For example, an equalization matrix $W=T^H$ completely isolates and separates the transmitted channels, thereby reproducing the two symbol streams, where the total noise power at each stream is unaltered. (The conjugate transpose $T^H$ would be the same as $T^{-1}$ for a unitary matrix.)

As applied to the example set forth hereinabove, one aspect of the present inventive technique is to select the array spacing d that produces a unitary matrix T. In the case of the example, this requires that the array spacing d will produce a difference in channel propagation between antennas equal to one quarter wavelength of the carrier frequency.

In a more general sense, the present inventive technique combines the composite received signals in a manner which emphasizes one channel and substantially cancels out all others, thereby achieving channel separation. This is done separately for each channel. As a notational convenience, this is represented herein in matrix form. The requirement of a "unitary" channel transfer matrix is essentially matrix shorthand for individual channel transfer characteristics that permit channel isolation and separation, without amplification of the additive noise inherent in any (single or multi-antenna) system. It should be noted, however, that unitarity is not a necessary condition for invertibility—a non-unitary transfer matrix can be inverted to yield channel separation, but at the cost of amplifying the additive thermal noise, which result in SNR degredation. On the other hand, a unitary channel matrix can be inverted without noise amplification. The array geometry (i.e., spacing and span) is specifically determined to satisfy this condition.

By permitting transmission of two independent symbol streams (transmit data streams), this configuration doubles the spectral efficiency of the system as contrasted with a conventional, single transmit/receive antenna system having the same bandwidth.

To put some specific numbers to the example given above, a carrier frequency $f_c$=23 GHz ($2.3 \times 10^{10}$ Hz) and a link length L=3 km (3000 m) are chosen. The wavelength λ is given by:

$$\lambda = \frac{c}{f_c} = \frac{2.998 \cdot 10^8 \ (m - sec^{-1})}{2.3 \cdot 10^{10} \ (sec^{-1})}$$
$$= 0.01303478 \ m$$
$$\approx 13 \ mm$$

According to the technique described above, d is given by:

$$d = \sqrt{L \frac{\lambda}{2} + \frac{\lambda^2}{16}}$$
$$= \sqrt{3000 \left( \frac{0.01303478}{2} \right) + \frac{(0.01303478)^2}{16}}$$
$$\approx 4.42 \ m$$

The array spacing d required to produce a unitary channel transfer matrix T decreases as the carrier frequency $f_c$ increases, and as the link length L decreases. For example, with $f_c$=38 GHz and L=2 km, an array spacing of d=2.75 m is required. In another example, with $f_c$=38 GHz and L=3 km, an array spacing of d=3.45 m would be required. It should be understood that, in physical realizations of these examples of carrier frequency, link length, and array spacing, that the numbers should be treated as approximate.

Since L>>d, the properties of the channel transfer properties of T (specifically, its reversibility nature) are relatively insensitive to antenna positioning inaccuracies resulting from the installation or the environment. In the foregoing example, d is selected to produce a unitary channel transfer matrix T. However, if the spacing of the transmit antenna elements were to be increased to d+20 cm (4.62 m in the case where d is 4.42 m), the increase in noise after channel inversion, relative to the noise in inverting the system with ideal posistioning would only be on the order of 0.03 dB.

In light of the foregoing discussion, the following statements can be made about the present inventive technique:

1. The geometry is chosen so that the differences in link length between individual transmit antenna elements and individual receive antenna elements are all related to the carrier wavelength λ and are selected to create a unitary channel transfer matrix. Prior-art methods that rely on symbol delays are generally not feasible in point-to-point MMW systems, since the delays that can be achieved within reasonable physical array sizes are very small relative to symbol time.

2. Due to strong channel attenuation typical to MMW, link distances are kept relatively short and line-of-sight, typically on the order of 0.5-6 km. The short links and the small wavelength enable practical size of the antenna arrays. The overall array physical size (resulting from the array spacing d, in the foregoing example) decreases as the carrier frequency increases and as the link length decreases.

3. The purpose of the transmit shaping matrix Q is threefold. First, it distributes the s symbol streams (transmit data streams) over the t transmit antennas. Second, it can be used to add compensation factors for non-ideal (non-unitary) array geometry, e.g., where physical limitations of the transmit and/or receive sites prevent ideal positioning of antenna array elements. Third, it can be used to add pre-channel compensation even in cases where the positioning is ideal, for example, applying Cholesky factorization to facilitated decision-based feedback between the antennas, etc.

FIG. 3 is a diagram of an antenna arrangement 300 for MMW communication having a transmit antenna array comprising three linearly arranged transmit antenna elements 314a, 314b and 314c, and a receive antenna array comprising three linearly arranged receive antenna elements 316a, 316b and 316c. Transmission channels (paths) and channel transfer characteristics between the first transmit antenna element 314a and each of the three receive antenna elements 316a, 316b and 316c are indicated as $T_{1,1}$, $T_{1,2}$ and $T_{1,3}$, respectively. Transmission channels (paths) and channel transfer characteristics between the second transmit antenna element 314b and each of the three receive antenna elements 316a, 316b and 316c are indicated as $T_{1,2}$, $T_{2,2}$ and $T_{3,2}$, respectively. Transmission channels (paths) and channel transfer characteristics between the third transmit antenna element 314c and each of the three receive antenna elements 316a, 316b and 316c are indicated as $T_{1,3}$, $T_{2,3}$ and $T_{3,3}$, respectively. Along a straight-line path, the transmit antenna elements 314a, 314b, and 314c are preferably evenly spaced, with an inter-element spacing (distance) of d. Similarly, along a straight-line path, the receive antenna elements 316a, 316b, and 316c are spaced evenly, with an inter-element spacing of d. The transmit and receive arrays are spaced apart by a link length distance L. Corresponding transmit and receive antenna elements (e.g., 314a and 316a), are positioned directly across from, aligned with, and aimed directly at one another. Individual direct link lengths ($L_{1,1}$, $L_{2,2}$, and $L_{3,3}$) for the corresponding transmit and receive antenna elements are equal to the overall link length L. Cross-link lengths ($L_{1,2}$, $L_{1,3}$, $L_{2,1}$, $L_{2,3}$, $L_{3,1}$ and $L_{3,3}$) are given by the equations below:

$$L_{1,1} = L_{2,2} = L_{3,3}$$
$$= L$$
$$L_{1,2} = L_{2,3} = L_{2,1} = L_{3,2}$$
$$= \sqrt{L^2 + d^2}$$
$$L_{1,3} = L_{3,1}$$
$$= \sqrt{L^2 + (2d)^2}$$

This yields two distinct cross-link lengths, depending upon whether the cross-link path spans a transverse distance of d or 2d. As in the previous example described hereinabove with respect to FIG. 2, the longer cross-link lengths ($L_{2,1}$, $L_{3,1}$, $L_{1,2}$, $L_{3,2}$, $L_{1,3}$ and $L_{2,3}$) result in phase shifted transmissions for non-corresponding transmit and receive antenna elements relative to those for corresponding receive and transmit antenna elements. Link length differences $\Delta L_{k,l}$ are given by:

$$\Delta L_{k,l} = L_{k,l} - L$$

where the subscripts k and l refer to receive and transmit antenna element ordinal, respectively, according to the aforementioned ordinal numbering convention. For notational convenience, $\Delta L_{1,2}$, $\Delta L_{2,3}$, $\Delta L_{2,1}$ and $\Delta AL_{3,2}$ will be denoted as $\Delta L_d$ (indicating a transverse cross-link distance of d between transmit and receive antenna elements) and $\Delta L_{3,1}$ and $\Delta L_{1,3}$ will be denoted as $\Delta L_{2d}$ (indicating a transverse cross-link distance of 2d between transmit and receive antenna elements). For a given carrier frequency $f_c$ and wavelength $\lambda$, any link length difference $\Delta L_{k,l}$ results in a phase shift $\phi_{k,l}$ according to the following equations:

$$\phi_{k,l} = 2\pi \frac{\Delta L_{k,l}}{\lambda}$$

$$\phi_d = 2\pi \frac{\Delta L_d}{\lambda}$$

$$\phi_{2d} = 2\pi \frac{\Delta L_{2d}}{\lambda}$$

where $\phi_d$ and $\phi_{2d}$ correspond to cross-link paths with transverse transmit to receive spans of d and 2d, respectively. When k=l, the link length is a direct link length between corresponding antenna elements and the phase shift is zero (0). These phase shifts are represented in a transfer matrix T as complex transfer characterstics $T_{k,l}$ according to the following relationship:

$$T_{k,l} = \cos\phi_{k,l} + j\sin\phi_{k,l}$$

Transfer characteristics for the direct link lengths (e.g., $T_{1,1}$) are equal to 1.0. Accordingly, the channel transfer matrix T for the antenna arrangement 300 of FIG. 3 is given by:

$$T = C_f \begin{pmatrix} 1 & \cos\phi_d + j\sin\phi_d & \cos\phi_{2d} + j\sin\phi_{2d} \\ \cos\phi_d + j\sin\phi_d & 1 & \cos\phi_d + j\sin\phi_d \\ \cos\phi_{2d} + j\sin\phi_{2d} & \cos\phi_d + j\sin\phi_d & 1 \end{pmatrix}$$

According to the present inventive technique, an array spacing (inter-element distance) d is determined that yields a unitary channel transfer matrix T. For a link length L of 3000 m and a carrier frequency $f_c$ of 23 GHz ($\lambda \approx 13$ mm), an inter-element distance d=3.6 m (total array span as measured between centers of the first and last antenna elements in each array=2d=7.2 m) yields a unitary channel transfer matrix T.

Therefore, the antenna arrangement of FIG. 3, implemented in a MMW communication system according to the present inventive technique as described above has three times the spectral efficiency of a similar single antenna system.

Generally speaking, the more antenna elements that there are in an array, the greater the spectral efficiency that may be achieved. And preferably, the number (t) of transmit antenna elements is equal to the number (r) of receive antenna elements.

The present invention technique is not restricted to linear arrays or antenna elements. When the transmit and/or receive arrays include large number of antennas, it is advantageous to use more generalized three-dimensional positioning of the antenna elements in the arrays. Such structures can result in smaller physical size, while maintaining high spectral efficiency. Applications of the present technique to larger and non-colinear antenna arrays are discussed hereinbelow.

FIG. 4 is a diagram of an antenna arrangement 400 for MMV communication having a transmit antenna array comprising three co-planar (but non-linear) transmit antenna elements 414a, 414b and 414c, and a receive antenna array comprising three co-planar (but non-linear) receive antenna elements 416a, 416b, and 416c. The arrays are of triangular shape, parallel (parallel-planar) with one another, and are spaced apart by a link length L. Both arrays (414x and 416x) are arranged in equilateral triangular configurations with an inter-element spacing (array spacing) of d. Corresponding antenna elements in the transmit and receive arrays are disposed facing, aligned with, and aimed directly at one another so that direct link lengths ($L_{1,1}$, $L_{2,2}$ and $L_{3,3}$)

between corresponding antenna elements in the transmit and receive arrays equal the link length L. Due to the equilateral triangular configuration, all cross-link lengths ($L_{2,1}$, $L_{3,1}$, $L_{1,2}$, $L_{3,2}$, $L_{1,3}$ and $L_{2,3}$) are equal and are given by the equations below:

$$L_{direct} = L_{1,1} = L_{2,2} = L_{3,3}$$
$$= L$$
$$L_{cross} = L_{1,2} = L_{2,3} = L_{2,1} = L_{3,2} = L_{1,3} = L_{3,1}$$
$$= \sqrt{L^2 + d^2}$$

This yields two distinct link lengths, one link length $L_{direct}$ for corresponding antenna elements and another link length $L_{cross}$ for non-corresponding antenna elements. As in the previous examples described hereinabove with respect to FIGS. 2 and 3, the longer cross-link lengths result in phase shifted transmissions for non-corresponding transmit and receive antenna elements relative to those for corresponding receive and transmit antenna elements. Link length differences $\Delta L_{k,l}$ are given by:

$$\Delta L_{k,l} = L_{k,l} - L$$

where the subscripts k and l refer to transmit and receive antenna element ordinal, respectively, according to the aforementioned ordinal numbering convention. The link length differences for all of the direct links ($\Delta L_{1,1}$, $\Delta L_{2,2}$ and $\Delta L_{3,3}$) are equal to zero. Since all cross-link distances $L_{cross}$ are the same, all link length differences for cross-links (paths between non-corresponding antenna elements) are the same. For notational convenience, all cross-link length differences will be denoted as $\Delta L_{cross}$ (corresponding to a transverse cross-link distance of d between transmit and receive antenna elements). For a given carrier frequency $f_c$ and wavelength $\lambda$, any link length difference $\Delta L_{k,l}$ results in a phase shift $\phi_{k,l}$ according to the following equations:

$$\phi_{k,l} = 2\pi \frac{\Delta L_{k,l}}{\lambda}$$
$$\phi_{cross} = 2\pi \frac{\Delta L_{cross}}{\lambda}$$
$$\phi_{direct} = 0$$

where $\phi_{cross}$ and $\phi_{direct}$ correspond to cross-link paths and direct-link paths, respectively. These phase shifts are represented in a transfer matrix T as complex transfer characteristics $T_{cross}$ according to the following relationship:

$$T_{cross} = \cos\phi_{cross} + j\sin\phi_{cross}$$

Transfer characteristics for the direct link lengths (e.g., $T_{1,1}$) are equal to 1.0. Accordingly, the channel transfer matrix T for the antenna arrangement 400 of FIG. 4 is given by:

$$T = C_f \begin{pmatrix} 1 & T_{cross} & T_{cross} \\ T_{cross} & 1 & T_{cross} \\ T_{cross} & T_{cross} & 1 \end{pmatrix}$$

As described hereinabove, an array spacing (inter-element distance) d is determined that yields a unitary channel transfer matrix T. For a link length L of 3000 m and a carrier frequency $f_c$ of 23 GHz ($\lambda \approx 13$ mm), an array spacing d=5.1 m yields a unitary channel transfer matrix T. It is noteworthy that the array spacing for the equilateral triangular array configuration of FIG. 4 is considerably smaller than that required for the linear three-element array configuration described hereinabove with respect to FIG. 3 (e.g., wherein d=3.6 m). The configuration of FIG. 4 yields an array configuration with considerably smaller physical dimensions than the configuration of FIG. 3, but with the same spectral efficiency.

FIG. 5 is a diagram of an antenna arrangement 500 for MMW communication having a transmit antenna array comprising four co-planar transmit antenna elements 514*a*, 514*b*, 514*c* and 514*d*, and a receive antenna array comprising four co-planar receive antenna elements 516*a*, 516*b*, 516*c* and 516*d*. The arrays are parallel (parallel-planar) with one another, and are spaced apart by a link length L. Both arrays (414*x* and 416*x*) are arranged in "square" configurations (equilateral rectangle) with an inter-element spacing along the sides of the squares (array spacing) of d. Corresponding antenna elements in the transmit and receive arrays are disposed facing, aligned with, and aimed directly at one another so that direct link lengths $L_{direct}$ ($L_{1,1}$, $L_{2,2}$, $L_{3,3}$ and $L_{4,4}$) between corresponding antenna elements in the transmit and receive arrays equal the link length L. Due to the square array configuration, all cross-link lengths along sides of the square ($L_{1,2}$, $L_{1,4}$, $L_{2,1}$, $L_{2,3}$, $L_{3,2}$, $L_{3,4}$, $L_{4,1}$ and $L_{4,3}$) are equal to a first cross-link length $L_{CS}$, and cross-link lengths across diagonals of the square ($L_{1,3}$, $L_{3,1}$, $L_{2,4}$, $L_{4,2}$) are equal to a second cross-link length $L_{CD}$. The individual link lengths are given by the equations below:

$$L_{direct} = L_{1,1} = L_{2,2} = L_{3,3} = L_{4,4}$$
$$= L$$
$$L_{CS} = L_{1,2} = L_{1,4} = L_{2,1} = L_{2,3} = L_{3,2} = L_{3,4} = L_{4,1} = L_{4,3}$$
$$= \sqrt{L^2 + d^2}$$
$$L_{CD} = L_{1,3} = L_{2,4} = L_{3,1} = L_{4,2}$$
$$= \sqrt{L^2 + 2d^2}.$$

This yields three distinct link lengths, one link length $L_{direct}$ for corresponding antenna elements, a second link length $L_{cross\_side}$ for non-corresponding antenna elements along sides of the square antenna arrangement and a third link length $L_{cross\_diag}$ for non-corresponding antenna elements across diagonals of the square antenna arrangement. As in the previous examples described hereinabove with respect to FIGS. 2 and 3, the longer cross-link lengths result in phase shifted transmissions for non-corresponding transmit and receive antenna elements relative to those for corresponding receive and transmit antenna elements. Link length differences are given by:

$$\Delta L_{direct} 0$$
$$\Delta L_{CS} = L_{CS} - L$$
$$\Delta L_{CD} = L_{CD} - L$$

For a given carrier frequency $f_c$ and wavelength $\lambda$, any link length difference results in a phase shift according to the following equations:

$$\phi_{direct} = 0$$

$$\phi_{CS} = 2\pi \frac{\Delta L_{CS}}{\lambda}$$

$$\phi_{CD} = 2\pi \frac{\Delta L_{CD}}{\lambda}$$

where $\phi_{CS}$, $\phi_{CD}$ and $\phi_{direct}$ correspond to cross-link paths along sides of the square arrangement, cross-link paths across diagonals of the square arrangement and direct-link paths, respectively. Translating these phase shifts to complex baseband notation, the channel transfer matrix T for the antenna arrangement 500 of FIG. 5 is given by:

$$T = C_f \begin{pmatrix} 1 & \cos\phi_{CS} + j\sin\phi_{CS} & \cos\phi_{CD} + j\sin\phi_{CD} & \cos\phi_{CS} + j\sin\phi_{CS} \\ \cos\phi_{CS} + j\sin\phi_{CS} & 1 & \cos\phi_{CS} + j\sin\phi_{CS} & \cos\phi_{CD} + j\sin\phi_{CD} \\ \cos\phi_{CD} + j\sin\phi_{CD} & \cos\phi_{CS} + j\sin\phi_{CS} & 1 & \cos\phi_{CS} + j\sin\phi_{CS} \\ \cos\phi_{CS} + j\sin\phi_{CS} & \cos\phi_{CD} + j\sin\phi_{CD} & \cos\phi_{CS} + j\sin\phi_{CS} & 1 \end{pmatrix}$$

Solving for an array spacing (inter-element distance along the sides of the square arrays) d that yields a unitary channel transfer matrix T where the link length L is 1000 m and the carrier frequency $f_c$ is 38 GHz ($\lambda \approx 7.9$ mm), produces d=1.99 m.

Phase Noise

Attention is now directed to performance of the present inventive technique in the presence of phase noise.

FIG. 6 is a block diagram of a system 600 for MMW (compare FIG. 1). The system 600 comprises transmit pulse shaping section 602, a transmitter section 604, a receiver section 606 and an equalization section 608.

The system 600 comprises a transmit shaping section 602, a transmitter section 604, an array of t transmit antenna elements 614a, 614b . . . 614t, an array of r receive antenna elements 616a, 616b . . . 616r, a receiver section 606, and an equalizer section 608. A set of s data streams 610a, 610b, 610c . . . 610s, each stream consisting of symbols to be transmitted, is shaped by the transmit shaping section 602 to produce t transmit streams 612a, 612b . . . 612t. The transmit section 604 transmits each of these streams over a corresponding one of the transmit antenna elements 614a, 614b . . . 614t. However, transmit-side phase noise sources 624a, 624b . . . 624t associated with each of the transmit streams inject equivalent phase noise contributions $e^{j\Phi_1}$, $e^{j\Phi_2}$ . . . $e^{j\Phi_t}$ into transmit antenna signal streams 622a, 622b . . . 622t from the transmitter section 604 immediately prior being transmitted via the antenna elements 614a, 614b . . . 614t. These equivalent phase noise contributions are representative of the cumulative effect of independent phase noise sources associated with each transmit antenna signal stream (622x) regardless of where they actually occur within the transmitter side of the system 600.

Each of the receive antenna elements 616a, 616b . . . 616r receives signals from all of the transmit antenna elements 614a, 614b . . . 614t simultaneously, but with phase shifts incurred in relation to their respective positions in the receive and transmit arrays. In addition, receive-side phase noise sources 626a, 626b . . . 624r associated with each of the receive antenna elements 616a, 616b . . . 616r inject equivalent phase noise contributions $e^{j\Theta_1}$, $e^{j\Theta_2}$ . . . $e^{j\Theta_r}$ into receive antenna signal streams 628a, 628b . . . 628r immediately prior their arrival at the receiver section 606. These equivalent phase noise contributions are representative of the cumulative effect of independent phase noise sources associated with each receive antenna signal stream (628x) regardless of where they actually occur within the system 600. The receiver section 606 receives and boosts the signal from the r receive antenna signal streams 628a, 628b . . . 628r, producing receive streams 618a, 618b . . . 618r. The equalizer section 608 equalizes and compensates the receive streams 618a, 618b . . . 618r, isolating and separating components of the transmitted signals therein by knowledge of their relative phase difference to produce received data streams 620a, 620b, 620c . . . 620s corresponding to transmit data streams 610a, 610b, 610c . . . 610s.

The present inventive technique of geometric design and implementation of multi-antenna systems is designed to work also in systems suffering from high phase, noise, despite the technique's reliance on phase differences at the carrier frequency to achieve channel separation.

Typically in MMW systems, an outdoor MMW radio unit (transmitter and/or receiver) is attached to the back of each antenna. This is also typically true for multi-antenna MMW systems, according to the present invention. In such systems, then, every antenna at the transmit and receive arrays adds one or more radio paths. Each transmitter or receiver adds its own phase noise. Phase noise contributions from individual transmitter or receiver are, in general, independent, since they originate at different, independent radio units. The introduction of a common reference signal to all local oscillators can reduce the effect of independent phase noise sources at each antenna. Nevertheless, some residual independent phase noise component is present even in common-reference radio schemes.

The phase noise sources can be modeled as complex diagonal matrices $\Phi$ and $\Theta$, modeling the transmit and receive phase noises, respectively, with complex diagonal elements whose phases vary according to the corresponding phase noise component These phase noises can be reduced by an array of equalizers, combined with PLLs.

Returning to the system 600 of FIG. 6, it is essentially the system 100 of FIG. 1 with phase noise sources (624a, 624b . . . 624t and 626a, 626b . . . 626t) inserted into the transmit and receive signal paths. System response S at the inputs (618a, 618b . . . 618r) to the equalizer section 608 can be represented in matrix form as:

$$S = F_r \Theta T \Phi F_t Q$$

$$= C_f \begin{pmatrix} e^{j\theta_1} & 0 \\ 0 & e^{j\theta_2} \end{pmatrix} \begin{pmatrix} 1 & j \\ j & 1 \end{pmatrix} \begin{pmatrix} e^{j\Phi_1} & 0 \\ 0 & e^{j\Phi_2} \end{pmatrix}$$

According to an aspect of the present invention, channel isolation and separation is achieved in the presence of phase noise, either independent or dependent, associated with the transmit and receive paths. The phase noise, once properly compensated, has essentially no effect on the spectral efficiency of multi-antenna MMW systems of the present invention.

The main difficulty is caused by phase noise sources associated with the receiver array, since in decoding one transmit stream the interference from other transmit streams has to be subtracted coherently. Once the phase noise sources have been subtracted coherently, the remaining phase noise due to transmit antennas causes no special difficulty to multi-antenna systems, and can be compensated and reduced exactly as in conventional, prior-art single-antenna systems.

FIG. 7 is a block diagram of portions of a multi-antenna MMW communication system 700 related to phase noise and phase noise cancellation. Mutually independent phase noise contributions $e^{i\phi 1}$, $e^{i\phi 2}$ are injected into two transmit streams 722a and 722b, respectively by phase noise sources 724a and 724b representative of the cumulative effect of all phase noise sources associated with those transmit streams. The resultant signal noise-laden is transmitted over a multi-antenna system 730 comprising a pair of transmit antenna elements 714a and 714b and a pair of receive antenna elements 716a and 716b. Signals received from receive antenna elements 716a and 716b have phase noise contributions $e^{i\theta 1}$, $e^{i\theta 2}$ added thereto by phase noise sources 726a and 726b, respectively, resulting in phase noise laden receive antenna streams 728a and 728b, respectively. The receive antenna streams 728a and 728b are received in a receiver section 706 which buffers them, producing receive streams 728a and 728b, respectively. The phase noise contributions $e^{i\theta 1}$, $e^{i\theta 2}$ are representative of the cumulative effect of all phase noise sources associated with the receive streams. An equalizer section 732, comprises four equalizers 734a, 734b, 734c and 734d, four initial phase locked loops 736a, 736b, 736c and 736d, two summers 738a and 738b, and two final phase locked loops 740a and 740b. Each equalizer 734a, 734b, 734c and 734d has an input and an output. The inputs of equalizers 734a, 734b, 734c and 734d are connected to receive streams 728a, 728b, 728a and 728b, respectively. The outputs of the equalizers 734a, 734b, 734c and 734d connect to a respective initial phase locked loop 736a, 736b, 736c and 736d. The four equalizers 734a, 734b, 734c and 734d apply equalization processes W11, W12, W13 and W14, respectively, between their respective inputs and outputs.

The phase-locked loops 736a, 736b, 736c, 736d, 740a and 740b and equalizers 734a, 734b, 734c, and 734d of FIG. 7 cancel the phase noise associated with the receive streams ($e^{i\theta 1}$, $e^{i\theta 2}$) and transmit streams ($e^{i\phi 1}$, $e^{i\phi 2}$). In the first receive stream 728a, first initial phase locked loop 736a (PLL-11) cancels θ1 (the phase noise associated with receive stream phase noise contribution $e^{i\theta 1}$), and second initial phase locked loop 736b (PLL-12) cancels θ2 (the phase noise associated with receive stream phase noise contribution $e^{i\theta 2}$) As described hereinabove, first and second equalizers 734a (W11) and 734b (W12) correspond to first and second elements, respectively, of an equalization matrix W that inverts the composite transmission channel between the transmit antenna elements 714a and 714b and receive antenna elements 716a and 716b. In combination with the summer 738a, these equalizers isolate and separate a first symbol stream from the receive streams 728a and 728b. With the receive phase noise (θ1 and θ2) cancelled, a first final phase-locked loop 740a (PLL-1) sees and cancels only φ1 (the phase noise associated with transmit stream phase noise contribution $e^{i\phi 1}$).

Similarly, in the second receive stream 728b, third initial phase locked loop 736c (PLL-21) cancels θ1 (the phase noise associated with receive stream phase noise contribution $e^{i\theta 1}$), and fourth initial phase locked loop 736d (PLL-22) cancels θ2 (the phase noise associated with receive stream phase noise contribution $e^{i\theta 2}$). Third and fourth equalizers 734c (W11) and 734d (W12) correspond to third and fourth elements, respectively, of an equalization matrix W that inverts the composite transmission channel between the transit antenna elements 714a and 714b and receive antenna elements 716a and 716b. In combination with the summer 738b, these equalizers isolate and separate a second symbol stream from the receive streams 728a and 728b. With the receive phase noise (θ1 and θ2) cancelled, a second final phase-locked loop 740b (PLL-2) sees and cancels only φ2 (the phase noise associated with transmit stream phase noise contribution $e^{i\phi 2}$).

A block diagram of a PLL 1000, of the kind used in the present invention to cancel the phase noise, is illustrated in FIG. 10. For example, consider the PLLs of FIG. 7: All of the PLLs appearing in that system may be of the form depicted in FIG. 10, where the signals "X" and "Y" depend on the specific location of the phase corrector. For example, for the PLL_11, "X" is the signal at the output of W11, the mixer 1002 of FIG. 10 is the multiplication device 736a of FIG. 7, and the signal "Y" is the output of the multiplication device 740a of FIG. 7. In principle, the decision device 1004 of FIG. 10 is the decision of the relevant stream in FIG. 7. With reference to FIG. 10, it is easy to verify that the signal Z2 is proportional to the instantaneous phase difference between the signals "Y" and "Z". (In case of a small phase difference, it is approximately the phase difference.) The instantaneous phase difference is subject to fluctuations due to symbol noise, thermal noise, etc., and thus it is filtered with a first or second order linear filter 1006. The signal Z3 at the output of the filter 1006 is the estimate of the phase error at the specific location of the PLL. PLLs are common devices in engineering systems, and many variations on their structure exist. The PLL of FIG. 10 is for illustration purposes only, to show that phase error cancellation is possible. The invention is not limited to this specific structure. For example, the phase detector can take into account phase corrections made by other PLLs in the system (coupled PLLs), etc.

The number and locations of the phase-locked loops in FIG. 7 are illustrative. The same result can be readily accomplished with four phase-locked loops instead of six. Referring again to FIG. 7, any one of the phase locked loops 736a (PLL-11), 736b (PLL-12), or 740a (PLL-11), can be removed without affecting overall phase noise cancellation performance. For example, removing phase-locked loop 740a (PLL-1) and adding its instantaneous angle to phase-locked loops 736a (PLL-12) and 736b (PLL-11) yields the same result. Removing phase-locked loop 740b (PLL-2) in the same manner, the same result achieved accomplished with only four phase-locked loops. Additionally, since the phase cancellation accomplished via the phase-locked loops 736b (PLL-12) and 736c (PLL-21) are identical except for polarity, it is possible to accomplish the same result with as few as three phase-locked loops.

Those of ordinary skill in the art will recognize that the phase noise cancellation technique of the present invention is readily extended to accommodate any number of receive streams.

Generalizing, the following statements can be made with respect to phase noise cancellation using phase-locked loops:

1. The order of equalizer and phase-locked loop, prior to summation, can be reversed. As an example, the first equalizer 734*a* and first phase-locked loop 736*a* of FIG. 7, both of which occur prior to the summer 738*a* can be swapped in position without affecting system performance.
2. The equalizers (e.g., 734*a*, 734*b*, 734*c* and 734*d*) in a system that uses phase-locked loops for phase noise cancellation are designed exactly as if there were no phase noise or phase noise cancellation, as described hereinabove with respect to FIGS. 2-5. That is, according to the present inventive: technique, the presence of phase noise does not alter the channel transfer characteristic, and hence does not affect the design of the equalizer portions of the equalize section 708.

Combined Dial Polarization and Multi-Antenna Systems

As is evident from the examples given above, adding antennas to the arrays in a multi-antenna system increases its spectral efficiency, but it has the inherent disadvantage of increasing the physical size of the array.

Dual polarization method is a well known technique for increasing spectral efficiency of antenna elements, and is based on the orthogonality of two polarizations (horizontal and vertical), which results in two substantially separated channels. (The channels are: not perfectly separated, due to leakages which always exist in dually polarized systems, especially in bad weather conditions.)

According to the invention, the spectral efficiency (capacity) of an array of given size can be increased (doubled) by using dual polarization antenna elements. The dual polarization method is easily combined with the multi-antenna systems of the present invention. The receiver for a combined dually-polarized multi-antenna systems has the same structure of the receiver as for multi-antenna systems, including the mitigation of phase noise.

The equivalent model of a dual polarization multi-antenna system is given by the matrix equation set forth hereinabove ($y=F_rTF_tQ$ a+n), with the exception that for dually-polarized antenna elements, the elements of the matrix T are 2×2 matrices, representing the leakages between the horizontal and vertical polarization of each antenna element, and channel attenuation.

According to the present inventive technique, a receiver/equalizer for combined dually polarized multi-antenna systems has the same structure as a receiver/equalizer for multi-antenna using physically separate antenna elements to communicate via the same number of channels. In fact, the systems only differ in two regards:

1) The two channels of a dual-polarization antenna share a common physical location. This is not so for channels that use separate antennas.
2) The magnitude of leak (cross interference) between horizontal and vertical paths in dual polarization systems depends strongly on the weather, link distance, and quality of antennas used, and can vary from −40 dB in short link, good weather conditions and high quality antennas, to −6 dB in heavy rain and long link. In multiantenna systems employing only one polarization, the cross channel interference is of the order of 0 dB.

The equivalent complex baseband channel transfer function of a dual polarization transmit and receive antenna pair is given by:

$$T = C_f \begin{pmatrix} 1 & \alpha_{H,V} \\ \alpha_{V,H} & 1 \end{pmatrix}$$

where $\alpha_{H,V}$ and $\alpha_{V,H}$ represent cross-polar distortion (XPD), and $C_f$ represents channel fading (attenuation). Not coincidentally, this response appears very similar to the channel transfer characteristic described above for the two-antenna system of FIG. 2, except that the XPD terms are not pure imaginary, and generally of magnitude less than −6 dB relative to the inline signal, even in bad weather conditions. The separation of channels in dual polarization systems is based on the fact that the interference magnitude is relatively low. On the other hand, the separation of signals in the multiantenna system is based on the specific phase differences, which are a result of the wavelnegth and the geometric structure.

FIG. 8 is a diagram of an arrangement 800 of dual-polarization transmit and receive antennas for MMW communication. First and second transmit antenna elements 814*a* and 814*b* represent horizontal (H) and vertical (V) channels, respectively of a first dual-polarized transmit antenna. Third and fourth transmit antenna elements 814*c* and 814*d* represent horizontal (H) and vertical (V) channels, respectively of a second dual-polarized transmit antenna. First and second receive antenna elements 816*a* and 816*b* represent horizontal (H) and vertical (V) channels, respectively of a first dual-polarization receive antenna. Third and fourth receive antenna elements 816*c* and 816*d* represent horizontal (H) and vertical (V) channels, respectively of a second dual-polarized receive antenna. A distance d spaces the two dual-polarized transmit antennas from one another. The same distance d spaces the two dual-polarization receive antennas.

The physical geometry of the arrangement 800 is essentially the same as that described hereinabove with respect to FIG. 2, except that for each channel path in FIG. 2, the system 800 of FIG. 8 has two substantially independent channel paths sharing the same endpoints.

Because of the dual-polarization antennas, the 2×2 physical antenna arrangement is the equivalent of a 4×4 single polarization array. The complete channel transfer matrix T for the arrangement 800 of FIG. 8 is given by:

$$T = C_f \begin{pmatrix} \begin{pmatrix} 1 & \alpha_{1,2} \\ \alpha_{2,1} & 1 \end{pmatrix} & j\begin{pmatrix} 1 & \alpha_{1,4} \\ \alpha_{2,3} & 1 \end{pmatrix} \\ j\begin{pmatrix} 1 & \alpha_{3,2} \\ \alpha_{4,1} & 1 \end{pmatrix} & \begin{pmatrix} 1 & \alpha_{3,4} \\ \alpha_{4,3} & 1 \end{pmatrix} \end{pmatrix}$$

where the $\alpha_{i,j}$ terms represent to the total leakage (XPD) from transmit antenna j to receive antenna i, using the ordinal numbering convention described hereinabove.

The channel transfer matrix in this case is not unitary, due to the leakage (XPD) which always exists between horizontal and vertical polarizations of dual-polarization antennas. The channel transfer matrix can be inverted with the aid of an equalizer compensating for both the XPD and the geometry for each receive stream.

3. FIG. 9 is a block diagram of a receive equalizer section 908 for a one of the four streams carried by the arrangement 800 of FIG. 8, comprising four equalizers 934a (W11), 934b (W12), 934c (W13) and 934d (W14) each arranged in series with a respective initial (inline) phase-locked loop 936a (PLL_11), 936b (PLL_12), 936c (PLL_13) and 936d (PLL_14), a summer 938 for combining the outputs of the four phase-locked loops 936a, 936b, 936c and 936d, and a final phase-locked loop 940 (PLL-1). Each equalizer 934a, 934b, 934c and 934d has a respective input 944a, 944b, 944c, and 944d, each connected to a respective one of the four receive streams from the four receive antenna elements 816a, 816b, 816c, and 816d. The equalizers compensate for both the XPD of the antenna arrangement 800 and the phase shifts associate with the geometry thereof. As was the case with FIG. 7, The order of equalizer and phase-locked loop, prior to summation, can be reversed. As an example, the first equalizer 934a and first phase-locked loop 936a of FIG. 9, both of which occur prior to the summer 938 can be swapped in position without affecting system performance.

The optimal equalizer is a vector equalizer W, comprising 16 filters, as this is the number of all paths between antennas. The structure of the PLLs is suitably as shown in FIG. 10, and the mode of operation is as explained for the system depicted in FIG. 7.

Those of ordinary skill in the art will recognize that, as described hereinabove with respect to FIG. 7, the equalizer section 908 can be implemented using fewer phase-locked loops.

Although the invention has been illustrated and described in detail in the drawings and foregoing description, the same is to be considered as illustrative and not restrictive in character—it being understood that only preferred embodiments have been shown and described, and that all changes and modifications that come within the spirit of the invention are desired to be protected. Undoubtedly, many other "variations" on the "themes" set forth hereinabove will occur to one having ordinary skill in the art to which the present invention most nearly pertains, and such variations are intended to be within the scope of the invention, as disclosed herein.

What is claimed is:

1. A millimeter-wave (MMW) communication system comprising:
    a transmit subsystem for providing signals to a plurality of transmit antenna elements; and
    a receive subsystem for receiving the signals from a plurality of receive antenna elements;
    wherein the transmit and receive antenna elements are physically arranged so that each of the receive antenna elements receives the signals transmitted from all of the transmit antenna elements with differing degrees of phase shift, and
    wherein: for a given one of the transmit antenna elements, a one of the receive antenna elements is a corresponding antenna element which is positioned directly across from, aligned with, and aimed at the given one of the transmit antenna elements, and the remaining receive antenna elements are non-corresponding antenna elements;
    there is an overall link length (L) between the transmit antenna elements and the receive antenna elements;
    there are direct link lengths ($L_{k,k}$) between corresponding antenna elements; there are cross-link lengths ($L_{k,l}$) between non-corresponding antenna elements; and
    the cross-link lengths ($L_{k,l}$) are longer than the direct link lengths by an amount dependent upon the link length (L) and the physical geometry of the transmit and receive antenna elements.

2. A millimeter-wave (MMW) communication system comprising:
    a transmit subsystem for providing signals to a plurality of transmit antenna elements; and
    a receive subsystem for receiving the signals from a plurality of receive antenna element;
    wherein the transmit and receive antenna elements are physically arranged so that each of the receive antenna elements receives the signals transmitted from all of the transmit antenna elements with differing degrees of phase shift, and wherein:
    the transmit subsystem comprises:
    a transmit shaping section for receiving a plurality of transmit data streams and producing a plurality of transmit streams;
    a transmitter section providing the plurality of transmit streams as the signals to the transmit antenna elements;
    the receive subsystem comprises:
    a receiver section for receiving and boosting the signals from the receive antenna elements and providing a plurality of receive streams;
    an equalizer section for receiving the plurality of receive streams, separating the signals from the transmit antennas from one another, and providing a plurality of received data streams corresponding to the plurality of transmit data streams.

3. System, according to claim 2, wherein: the equalizer section equalizes and compensates the receive streams by isolating and separating components of the transmitted signals therein based on their relative phase difference to produce the received data streams corresponding to the transmit data streams.

4. System, according to claim 2, wherein:
    each of the plurality of transmit data streams comprises an independent stream of symbols to be transmitted; each of the resulting plurality of independent streams of symbols are convolved with a transmission pulse to form a composite signal and are multiplexed into the plurality of transmit streams via a transmit shaping matrix (Q) in the transmit shaping section.

5. System, according to claim 4, wherein:
    the composite signals received by the receive antenna elements is represented in complex baseband by the matrix equation $y = F_r T F_t Q\, a + n$ wherein:
    y is an r×1 complex vector representing the composite received signal as represented on the plurality of receive streams;
    a is an s×1 vector of information symbols representing data encoded onto the plurality of transmit data streams;
    T is a two-dimensional matrix representing composite complex transfer characteristics of a transmission path between the receive and transmit antenna elements, and elements ($T_{k,l}$) of the matrix T represent the transfer characteristics of individual transmission paths between individual receive antenna elements and individual transmit antenna elements;
    Q is a t×s transmit shaping matrix representing the manner in which symbol data on the plurality of transmit data streams modulates the transmit pulse and is distributed across the plurality of transmit streams;

n is an r×1 complex Gaussian noise vector representing noise experienced at each of the plurality of receive antenna elements; and $F_t$ and $F_r$ are diagonal matrices representing the gains of the individual transmit and receive antenna elements, respectively.

6. System, according to claim 5, wherein:

the signals are transmitted at a carrier frequency ($f_c$);

there is a link length (L) between the transmit antenna elements and the receive antenna elements;

there is an inter-element spacing (a) between adjacent ones of the transmit antenna elements, and a substantially equal inter-element spacing (d) between adjacent ones of the receive antenna elements; and the transmit shaping matrix. (Q), an inter-element spacing (d) and a geometry of the transmit and receive antenna elements are determined as a function of the carrier frequency ($f_c$) and link length (L).

7. System according to claim 6, wherein:

the parameters of the transmit shaping matrix (Q) are determined so that a resultant equivalent transfer matrix $F_r TF_t Q$ can be inverted readily without introducing significant sources of error.

8. System according to-claim 6, wherein:

the transmit shaping matrix (Q) and an inter-element spacing (d) and a geometry of the transmit and receive antenna elements are selected to take maximum advantage of phase differences over transmission paths of differing lengths to achieve channel discrimination with minimal signal-to-noise ratio (SNR) degradation.

9. A millimeter-wave (MMW) communication system comprising:

a transmit subsystem for providing signals to a plurality of transmit antenna elements; and a receive subsystem for receiving the signals from a plurality of receive antenna elements;

wherein the transmit and receive antenna elements are physically arranged so that each of the receive antenna elements receives the signals transmitted from all of the transmit antenna elements with differing degrees of phase shift, and wherein:

the signals are transmitted at a carrier frequency ($f_c$);

there is a link length (L) between the transmit antenna elements and the receive antenna elements;

there is an inter-element spacing (d) between adjacent ones of the transmit antenna elements, and a substantially equal inter-element spacing d between adjacent ones of the receive antenna elements;

the carrier frequency ($f_c$) is approximately 23 GHz;

the link length (L) is approximately 3 km; and the spacing (d) is approximately 4.42 m.

10. A millimeter-wave (MMW) communication system comprising:

a transmit subsystem for providing signals to a plurality of transmit antenna elements; and a receive subsystem for receiving the signals from a plurality of receive antenna elements;

wherein the transmit and receive antenna elements are physically arranged so that each of the receive antenna elements receives the signals transmitted from all of the transmit antenna elements with differing degrees of phase shift, and wherein:

the signals are transmitted at a carrier frequency ($f_c$);

there is a link length (L) between the transmit antenna elements and the receive antenna elements;

there is an inter-element spacing (d) between adjacent ones of the transmit antenna elements, and a substantially equal inter-element spacing d between adjacent ones of the receive antenna elements;

the carrier frequency ($f_c$) is approximately 23 GHz;

the link length (L) is approximately 3 km; and the spacing (d) is approximately 3.6 m.

11. A millimeter-wave (MMW communication system comprising:

a transmit subsystem for providing signals to a plurality of transmit antenna elements; and a receive subsystem for receiving the signals from a plurality of receive antenna elements;

wherein the transmit and receive antenna elements are physically arranged so that each of the receive antenna elements receives the signals transmitted from all of the transmit antenna elements with differing degrees of phase shift, and wherein:

the signals are transmitted at a carrier frequency ($f_c$);

there is a link length (L) between the transmit antenna elements and the receive antenna elements;

there is an inter-element spacing (d) between adjacent ones of the transmit antenna elements, and a substantially equal inter-element spacing d between adjacent ones of the receive antenna elements;

the carrier frequency ($f_c$) is approximately 23 GHz;

the link length (L) is approximately 3 1 km; and the spacing (d) is approximately 5.1 m.

12. A millimeter-wave (MMW) communication system comprising;

a transmit subsystem for providing signals to a plurality of transmit antenna elements; and a receive subsystem for receiving the signals from a plurality of receive antenna elements;

wherein the transmit and receive antenna elements are physically arranged so that each of the receive antenna elements receives the signals transmitted from all of the transmit antenna elements with differing degrees of phase shift, and wherein:

the signals are transmitted at a carrier frequency ($f_c$);

there is a link length (L) between the transmit antenna elements and the receive antenna elements;

there is an inter-element spacing (d) between adjacent ones of the transmit antenna elements, and a substantially equal inter-element spacing d between adjacent ones of the receive antenna elements;

the carrier frequency ($f_c$) is approximately 38 GHz;

the link length (L) is approximately 3 km; and the spacing (d) is approximately 3.45 m.

13. A millimeter-wave (MMW) communication system comprising;

a transmit subsystem for providing signals to a plurality of transmit antenna elements; and a receive subsystem for receiving the signals from a plurality of receive antenna elements;

wherein the transmit and receive antenna elements are physically arranged so that each of the receive antenna elements receives the signals transmitted from all of the transmit antenna elements with differing degrees of phase shift, and wherein:

the signals are transmitted at a carrier frequency ($f_c$);

there is a link length (L) between the transmit antenna elements and the receive antenna elements;

there is an inter-clement spacing (d) between adjacent ones of the transmit antenna elements, and a substantially equal inter-element spacing d between adjacent ones of the receive antenna elements;

the carrier frequency ($f_c$) is approximately 38 GHz;

the link length (L) is approximately 2 km; and the spacing (d) is approximately 2.74 in.

14. A millimeter-wave (MMW communication system comprising:
- a transmit subsystem for providing signals to a plurality of transmit antenna elements; and
- a receive subsystem for receiving the signals from a plurality of receive antenna elements;
- wherein the transmit and receive antenna elements are physically arranged so that each of the receive antenna elements receives the signals transmitted from all of the transmit antenna elements with differing degrees of phase shift, and wherein:
- the signals are transmitted at a carrier frequency ($f_c$);
- there is a link length (L) between the transmit antenna elements and the receive ahtenna elements;
- there is an inter-element spacing (d) between adjacent ones of the transmit antenna elements, and a substantially equal inter-element spacing d between adjacent ones of the receive antenna elements;
- the carrier frequency ($f_c$) is approximately 38 GHz;
- the link length (L) is approximately 1 km; and
- the spacing (d) is approximately 1.99 m.

15. A millimeter-wave (MMW) communication system comprising:
- a transmit subsystem for providing signals to a plurality of transmit antenna elements; and
- a receive subsystem for receiving the signals from a plurality of receive antenna elements;
- wherein the transmit and receive antenna elements are physically arranged so that each of the receive antenna elements receives the signals transmitted from all of the transmit antenna elements with differing degrees of phase shift, and wherein:
- there are two transmit antenna elements (214) arranged in a transmit array, and separated by a distance (d);
- there are two receive antenna elements (216), arranged in a receive array, and separated by a distance substantially equal to the distance (d);
- there is an overall link length (L) representing a linear distance between the transmit and receive arrays;
- a direct link distance between a first of the two transmit antenna elements and a first of the two receive antenna elements is substantially equal to a direct link distance between a second of the two transmit antenna elements and a second of The receive antenna elements;
- a cross-link distance between the first of the two transmit antenna elements and The second of the two receive antenna elements is substantially equal to a cross-link distance between a second of the two transmit antenna elements and a first of the receive antenna elements; and
- the distance (a) is chosen so that the cross-link lengths are longer than the direct link lengths by an amount substantially equal to one quarter of a carrier wavelength of the signals.

16. A millimeter-wave (MMW) communication system comprising:
- a transmit subsystem for providing signals to a plurality of transmit antenna elements; and
- a receive subsystem for receiving the signals from a plurality of receive antenna elements;
- wherein the transmit and receive antenna elements are physically arranged so that each of the receive antenna elements receives the signals transmitted from all of the transmit antenna elements with differing degrees of phase shift, and wherein;
- the receive subsystem further comprises:
- an equalizer section comprising a first equalizer, a second equalizer, a third equalizer, and a fourth equalizer, each having an input and an output;
- the inputs of the first and third equalizers are connected to receive a first input stream from a first receive antenna element;
- the inputs of the second and fourth equalizers are connected to receive a second input stream from a second receive antenna element;
- the outputs of the equalizers are connected to corresponding first, second, third and fourth phase locked loops, each having an output;
- the outputs of the first and second phase locked loops are summoned in a first summer, said summer having an output; and
- the outputs of the third and fourth phase locked loops are summed in a second summer, said summer having an output.

17. System, according to claim 16, further comprising:
- a fifth phase locked loop connected to the output of the first summer; and
- a sixth phase locked loop connected to the output of the second summer.

18. System, according to claim 16, wherein:
- the first and second equalizers correspond to first and second elements, respectively, of an equalization matrix W that inverts a composite transmission channel between the transmit antenna elements and the receive antenna elements.

19. System, according to claim 16, wherein;
- the first and second equalizers isolate and separate a first symbol stream from two receive streams; and
- the third and fourth equalizers isolate and separate a second symbol stream from the two receive streams.

20. A millimeter-wave (MMW) communication system comprising:
- a transmit subsystem for providing signals to a plurality of transmit antenna elements; and
- a receive subsystem for receiving the signals from a plurality of receive antenna elements;
- wherein the transmit and receive antenna elements are physically arranged so that each of the receive antenna elements receives the signals transmitted from all of the transmit antenna elements with differing degrees of phase shift, and wherein:
- the receive subsystem further comprises:
- an equalizer section comprising a first phase locked loop, a second phase locked loop, a third phase locked loop, and a fourth phase locked loop, each having an input and an output;
- the inputs of the first and third phase looked loop are connected to receive a first input stream from a first receive antenna element;
- the inputs of the second and fourth phase locked loop are connected to receive the second input stream from a second receive antenna element;
- the outputs of the phase locked loop are connected to corresponding first, second, third and fourth equalizers, each having an output;
- the outputs of the first and second equalizers are summed in a first summer, said summer having an output; and
- the outputs of the third and fourth equalizers are summed in a second summer, said summer having an output.

21. System, according to claim 20, further comprising:
- a fifth phase locked loop connected to the output of the first summer; and a sixth phase locked loop connected to the output of the second summer.

22. A millimeter-wave (MMW) communication system comprising:
- a transmit subsystem for providing signals to a plurality of transmit antenna elements; and
- a receive subsystem for receiving the signals from a plurality of receive antenna elements;
- wherein the transmit and receive antenna elements are physically arranged so that each of the receive antenna elements receives the signals transmitted from all of the transmit antenna elements with differing degrees of phase shift, and wherein;
- the receive subsystem further comprises:
- a first equalizer, a second equalizer, a third equalizer, and a fourth equalizer, each having an input and an output;
- the input of the first equalizer is connected to receive a first input stream from a first receive antenna element;
- the input of the second equalizer is connected to receive a second input stream from a second receive antenna element;
- the input of the third equalizer is connected to receive a third input stream from a third receive antenna element;
- the input of the fourth equalizer is connected to receive a fourth input stream from a fourth receive antenna element;
- the outputs of the equalizers are connected to corresponding first, second, third and fourth phase locked loops, each having an output; and
- the outputs of the first, second, third and fourth phase locked loops are summed in a summer having an output.

23. System, according to claim 22, further comprising:
- a fifth phase locked loop connected to the output of the summer.

24. A millimeter-wave (MMW) communication system comprising:
- a transmit subsystem for providing signals to a plurality of transmit antenna elements; and
- a receive subsystem for receiving the signals from a plurality of receive antenna elements;
- wherein the transmit and receive antenna elements are physically arranged so that each of the receive antenna elements receives the signals transmitted from all of the transmit antenna elements with differing degrees of phase shift, and wherein;
- the receive subsystem further comprises:
- a first phase locked loop, a second phase locked loop, a third phase locked loop, and a fourth phase locked loop, each having an input and an output,
- the input of the first phase locked loop is connected to receive a first input stream from a first receive antenna element;
- the input of the second phase locked loop is connected to receive a second input stream from a second receive antenna element;
- the input of the third phase locked loop is connected to receive a third input stream from a third receive antenna element;
- the input of the fourth phase locked loop is connected to receive a fourth input stream from a fourth receive antenna element;
- the outputs of the phase locked loop are connected to corresponding first, second, third and fourth equalizers, each having an output; and
- the outputs of the first, second, third and fourth equalizers are summed in a summer having an output.

25. System, according to claim 24, further comprising:
- a fifth phase locked loop connected to the output of the summer.

* * * * *

UNITED STATES PATENT AND TRADEMARK OFFICE
CERTIFICATE OF CORRECTION

| | |
|---|---|
| PATENT NO. | : 7,272,408 B2 |
| APPLICATION NO. | : 10/344861 |
| DATED | : September 18, 2007 |
| INVENTOR(S) | : Hezi Dalal and Yossi Steinberg |

It is certified that error appears in the above-identified patent and that said Letters Patent is hereby corrected as shown below:

On The Title Page, Item (63)

Related U.S. Application Data: --Provisional application No. 60/225,657 filed on August 16, 2000-- should be added.

Claim 2, column 22 should be corrected as follows:

Line 10: change "element" (Singular) to Plural --elements--

Claim 11, column 24 should be corrected as follows:

Line 24: delete "1" between "3" and "km"

Claim 14, column 25 should be corrected as follows:

Line 14: change "ahtenna" to --antenna--

Claim 15, column 25 should be corrected as follows:

Line 45: "The" which is between "of" and "receive" should be changed to --the--
    Line 47: "The" which is between "and" and "second" should be changed to --the--

Claim 16, column 26 should be corrected as follows:

Line 15: "summoned" should be changed to --summed--

UNITED STATES PATENT AND TRADEMARK OFFICE
CERTIFICATE OF CORRECTION

PATENT NO.          : 7,272,408 B2
APPLICATION NO. : 10/344861
DATED                  : September 18, 2007
INVENTOR(S)       : Hezi Dalal and Yossi Steinberg It is certified that error appears in the above-identified patent and that said Letters Patent is hereby corrected as shown below:

Claim 20, column 26 should be corrected as follows:

Line 52: "looked" should be changed to --locked--

Signed and Sealed this

Eighteenth Day of December, 2007

JON W. DUDAS
*Director of the United States Patent and Trademark Office*